United States Patent [19]

Johnson

[11] Patent Number: 5,030,890
[45] Date of Patent: Jul. 9, 1991

[54] TWO TERMINAL INCANDESCENT LAMP CONTROLLER

[76] Inventor: Samuel A. Johnson, 603 Los Luceros, Eagle, Id. 83616

[21] Appl. No.: 345,214

[22] Filed: Apr. 28, 1989

Related U.S. Application Data

[63] Continuation-in-part of Ser. No. 198,282, May 25, 1988, abandoned.

[51] Int. Cl.⁵ ............................................. H05B 41/14
[52] U.S. Cl. .................................... 315/208; 315/297; 323/325; 323/238
[58] Field of Search ......... 315/208, 360, 362, DIG. 5, 315/DIG. 7, 293, 297; 323/321, 322, 326, 325, 238, 239, 241

[56] References Cited

U.S. PATENT DOCUMENTS

| | | | |
|---|---|---|---|
| 3,818,263 | 6/1974 | Belko | 315/32 |
| 3,823,339 | 7/1974 | Borneman et al. | 315/69 |
| 3,952,242 | 4/1976 | Ukai | 323/21 |
| 4,090,107 | 5/1978 | Seib | 315/156 |
| 4,204,149 | 5/1980 | Cleary | 323/24 |
| 4,276,486 | 6/1981 | Ahuja et al. | 307/252 B |
| 4,276,542 | 6/1981 | Russ | 340/326 |
| 4,322,632 | 3/1982 | Hart et al. | 307/41 |
| 4,504,778 | 3/1985 | Evans | 323/323 |
| 4,613,790 | 9/1986 | Roorda | 315/72 |
| 4,628,230 | 12/1986 | Krokaugger | 315/307 |
| 4,634,957 | 1/1987 | Hollaway | 323/242 |
| 4,644,226 | 2/1987 | Vernooij et al. | 315/50 |
| 4,668,877 | 5/1987 | Kunen | 307/116 |

Primary Examiner—Eugene R. LaRoche
Assistant Examiner—Ali Neyzari
Attorney, Agent, or Firm—William J. Bethurum

[57] ABSTRACT

A two-terminal, alternating current power control device connected in an electrical path between a load and a remote switch, comprising a current switching device, a controlling device and a direct current power supply device. The current switching device provides a low impedance electrical path in response to the application of triggering signals thereto, and provides a high impedance electrical path in the absence of the triggering signals. A control circuit is provided for applying triggering signals to the current switching device as the proper time in the AC cycle, and is responsive to a momentary interruption in the applied AC voltage so as to effect change in the power intensity or timed duration of power delivered to the load. A remote switch in the electircal path can be the source of a momentary power interruption. The entire power control device can be constructed to directly attach to the electrical screw shell base of a gas discharge lamp, so the lamp and power control device can be mounted into the normal accommodating electrical fixture without the need for an intermediary fixture or additional electrical wiring.

9 Claims, 4 Drawing Sheets

TWO TERMINAL INCANDESCENT LAMP CONTROLLER

BACKGROUND OF THE INVENTION

The present invention relates to AC power control devices, and more particularly, to two terminal incandescent lamp controllers.

The single pole, single throw (SPST) fast acting electrical lighting switch has been the primary device for the control of alternating current to Edison and fluorescent lighting fixtures for over a century. It is simple in operating concept, and has evolved into a highly reliable and inexpensive means of lighting control. Its obvious limitation is the purely binary nature of its control of current. It is either fully on or fully off, except during those initial microseconds prior to closure or following opening. Depending on the inductive or capacitive nature of the applied load, arcing and mechanical damage to the current carrying contacts may occur, thus reducing the long term reliability of the switch. Additionally, as most electrical loads exhibit initially lower impedances when first turned on, the initial in-rush currents to both the switch and the electrical load can be many times higher than the steady state, normal operating currents. This current in-rush phenomena is damaging safety limits of the wiring network and the protective circuit breakers or fuses. Thus, these elements must be greatly over-designed to survive the initial current in-rush conditions.

The past two decades have seen the development of solid state dimmers and mechanical and electronic timer switches intended to directly replace the SPST lighting control switch for commercial and residential control of the Edison gas discharge lamps. Such devices tend to be larger in size than the SPST lighting switch they are intended to replace, and require the homeowner to perform a lengthy procedure to disconnect the power to the effected lighting circuit, remove the previous switch, and install the new device. To many homeowners possessing a healthy fear of electricity, this installation procedure appears dangerous, and thus they would not purchase or install such a device. The primary failure mode of such devices is during the initial turn-on phase, when the in-rush currents of gas discharge lamps can be 16 to 20 times that of the steady state current. As a result, such devices must have very heavy duty current switching elements to withstand this initial electrical stress, which adds significantly to the cost and complexity of the controlling device.

Still other devices exist which act as intermediary fixtures between the incandescent bulb to be controlled and the original receiving fixtures. These devices are usually used to turn on the lamp at the advent of nightfall, or upon sensation of sound or motion. Such devices, while very useful, can only be used in a limited number of fixtures since they add considerable length to the overall bulb to fixture dimensions. Such devices also tend to be unreliable due to the large current in-rushes through the power switching device at initial turn-on.

SUMMARY OF THE INVENTION

The general object of this invention is to provide a new and improved AC power control device which does not require a lengthy installation procedure, which can be fitted onto any standard incandescent bulb, and which does not require the above-mentioned oversized current switching devices with their attendant costs and circuit complexities.

Another object of the present invention to provide a solid state power control device which when connected in an electrical path between an alternating current voltage source and a load element, will be responsive to a remotely induced momentary power interruption, so as to cause a change in the intensity or duration of power delivered to the load.

A further object of this invention is to increase the useful life of electric gas filled discharge lamps by slowly applying power to a load at initial voltage application by closure of a remotely located mechanical or solid state switch.

A feature of this invention is the capability of being so constructed to directly attach to the electrical screw shell of a gas discharge lamp, whereby so little space is consumed by the device that the lamp can be safely mounted in its receiving fixture. This feature permits the use of existing switches, fixtures, and wiring by the user to achieve a variety of lighting conditions simply by installing this device.

The above objects, features and attendant advantages of this invention may be accomplished by the provision of a current switching means being connected in an electrical path between a load and an AC voltage source. The application of AC voltage is controlled by a remote switch. A control circuit means is connected to the triggering port of the current switching means so as to cause the current switching means to change from a high impedance state to a low impedance state, thus turning on the electrical load. This control circuit means can also be responsive to a momentary power interruption caused by opening, then closing, the remote switch. This even can cause the control circuit means to substantially modify the power delivered to the load, either by a change in the intensity or the timed duration of the power delivered to the load.

By using miniaturized assembly and packaging techniques, such a power control device can be fitted between the existing center terminals of an incandescent bulb base and the mating terminals of the screw shell receptacle, without significantly reducing the number of engaging threads needed to safely mechanically retain the bulb in its retaining fixture.

These and other objects and features of this invention will become more readily apparent from the following description of the accompanying drawings.

BRIEF DESCRIPTION OF THE DRAWINGS

FIG. 5 is a diagram illustrating the current in-rush of a typical incandescent bulb as a function of time after turn-on.

DETAILED DESCRIPTION OF THE INVENTION

Figure 1:
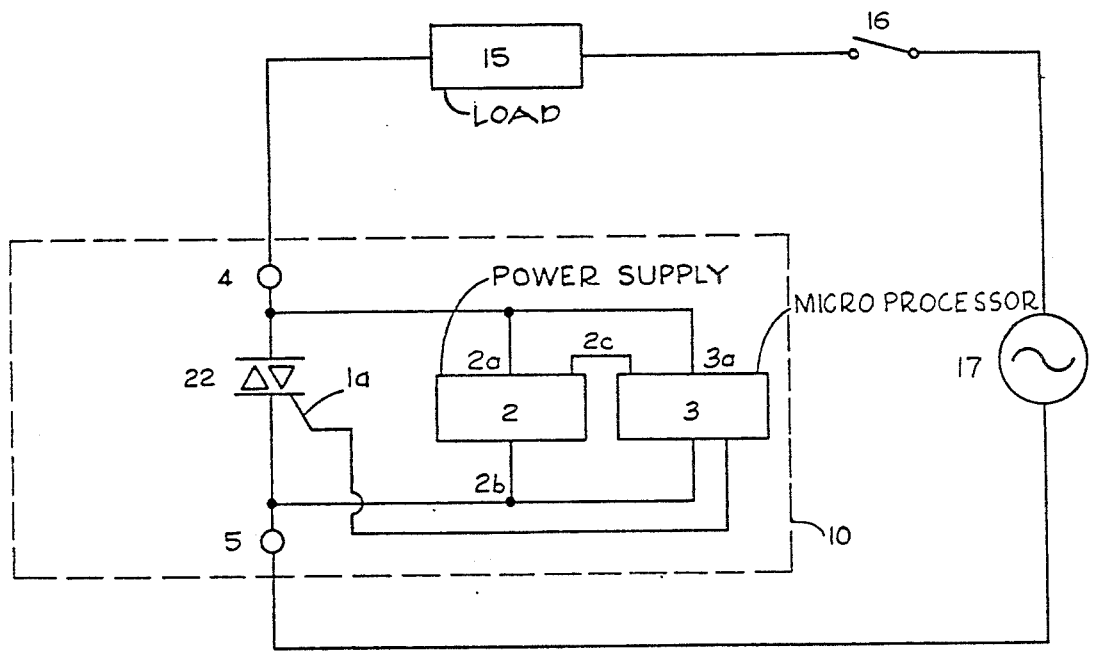
FIG. 1 is a block diagram of the power control device of this invention.

Referring to the drawings, FIG. 1 shows a power controller 10 made in accordance with the present invention. The power controller comprises two terminals 4 and 5, which are connected in series with a load 15, a main remote power switch 16, and an AC source 17.

FIG. 1 depicts a triac semi-conductor switch 1 in series with triac terminals 4 and 5. A triac is a bidirectional dual silicon controlled rectifier (SCR) which can conduct current in both directions only upon the application of a short low voltage current pulse applied to the gate terminal 6 at the proper time in the AC cycle. The triac will then latch into conduction for the remainder of the positive or negative going AC cycle until the impressed voltage across terminals 4 and 5 is at or near zero, at which time the triac returns to its normally high impedance state until again triggered.

Also included within power controller 10 as shown in FIG. 1 is a direct current power supply means 2, which has two terminals 2a and 2b connected in shunt with the triac 1, whereby the voltage across the said triac when it is in normally high impedance state is reduced in magnitude by any number of well-known means, and is rectified and filtered to become a steady source of direct current at a third terminal 2c.

Also comprising power controller 10 as shown in FIG. 1 is a micro-processor control circuit 3, being powered by DC source 2 and having voltage sensing terminal 3a to detect the AC zero crossing across terminals 4 and 5 when said triac 1 is in a non-conduction state. Also, a trigger terminal 3b connected directly to triac gate trigger 1a triggers said triac into conduction at the proper time in the AC waveform. The micro-processor control circuit can be any combination of generally known computer devices, memories, input-/output devices, etc. Such control circuit has a property to retain data recently stored in the memory elements even during relatively long periods of power interruption, such interruption caused by the intentionaly opening of the remote switch, or by an unanticipated power failure. In the present embodiment the device is a single chip 4-bit microcontroller being readily commercially available having internal random access memory (RAM), read only memory (ROM), and Input/Output (I/0) drivers. The many possible operating modes of the complete power controller 10 and the controller responses to momentary interruptions in the applied AC voltage are determined by the computer program resident in internal ROM.

As an illustrative example, the power controller 10 of FIG. 1 can be a means of modulating the power intensity delivered to a heating, lighting or motor load. After initially closing remote switch 16, the power to the load will be maintained at some initial value determined by the period of time the triac remains in a high impedance state following a zero crossing, and prior to the microprocessor control circuit issuing a command to fire the triac into a conducting state. By programming the micro-processor control circuit to sense a power interruption caused by the rapid opening and closing of remote switch 16, the power delivered to the load can be varied. By modifying when the triac is triggered into conduction after zero voltage crossing of the applied AC waveform across triac terminals 4 and 5, various preprogrammed values can be selected. Successive short power interruptions can modify the firing of the triac to create an entire range of power intensity values delivered to the load. For example, a single on-off sequence of switch 16 can be programmed to supply full power to load 15; two on-off sequences might produce 60% power, and three such sequences might supply 40% power.

In another embodiment, the apparatus of the present invention can be used as a delay timer, as for household lighting. The power controller 10, when connected to an existing load and remote switch of FIG. 1, can be programmed to turn on or turn off a load after a specified time interval following the closure of remote switch 16. Variable timed interval duration can be selected by a user such that the period of delay can be selected depending upon how many on-off cycles of switch 16 the user initiates.

As yet another embodiment, the power controller 10 can be programmed to provide a "soft-start" to a load at initial remote switch 16 closure. By initially delaying the firing of the triac well beyond the zero crossing of the AC waveform impressed across the triac terminal 4 and 5, the initial power surge can be dampened and load life increased. Rather than using phase control as in commercially available solid state dimmer switches designed for use with incandescent lighting circuits, the power controller 10 controls the rate of power increase to full power after initial turn on according to the particular program instructions resident in ROM.

Figure 2:
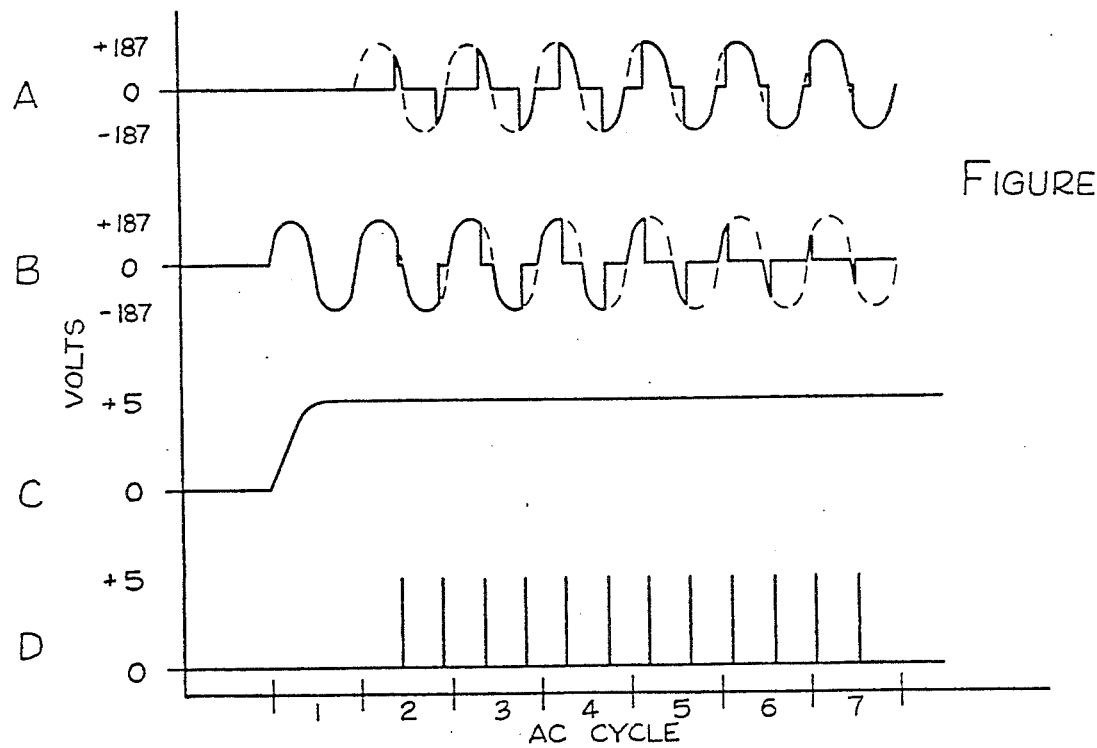
FIG. 2 is a diagram illustrating the applied voltages across the various electrical terminals of the power control device of FIG. 1.

Operation of the power controller 10 of FIG. 1 above can be best understood by referring to FIG. 2, which depicts voltage waveforms A, B, C and D with respect to time. Assuming the AC source of FIG. 1 is 115 volts RMS, 60 hertz, the peak voltage excursions of the sinusoidal waveform approach $+/-187$ volts with a period of approximately 16.66 milliseconds. Curve A represents the voltage impressed across the load terminals of FIG. 1; curve B represents the voltage across terminals 4 and 5 of controller 10; curve C is the output of the DC power supply means of controller 10, and curve D is the pulse generated by the micro-processor control circuit which is applied to the gate of triac 1 to trigger the triac into conduction.

Following a very long period with switch 16 "open", upon closure of remote switch 16, at time $t=0$ of FIG. 2, an AC waveform will be impressed across the triac terminals 4 and 5 (curve B) as long as the triac remains in the high impedance, untriggered state. During this first AC cycle, DC power supply 2 will rectify and reduce in magnitude the applied waveform across terminals 2a and 2b so that a filtered, low ripple DC voltage appears at terminal 2c, as illustrated by curve C of FIG. 2. This voltage, present at the microprocessor power terminal, will then enable the micro-processor to begin executing a unique program or programs resident in the read-only-memory (ROM) or in the form of pre-programmed digital logic. Based on the particular function desired, the micro-processor control circuit may then trigger the triac into conduction at certain desired time delays following the sensed zero crossing at terminal 3a. As illustrated for AC cycles 1-7, of curve D, the soft-start feature can be implemented at initial device turn-on whereby in each successive AC cycle, increasing amounts of power are delivered to the load by simply decreasing the amount of delay between the time the zero crossing occurs as shown in curve B and the time the triac is caused to fire.

Figure 3:
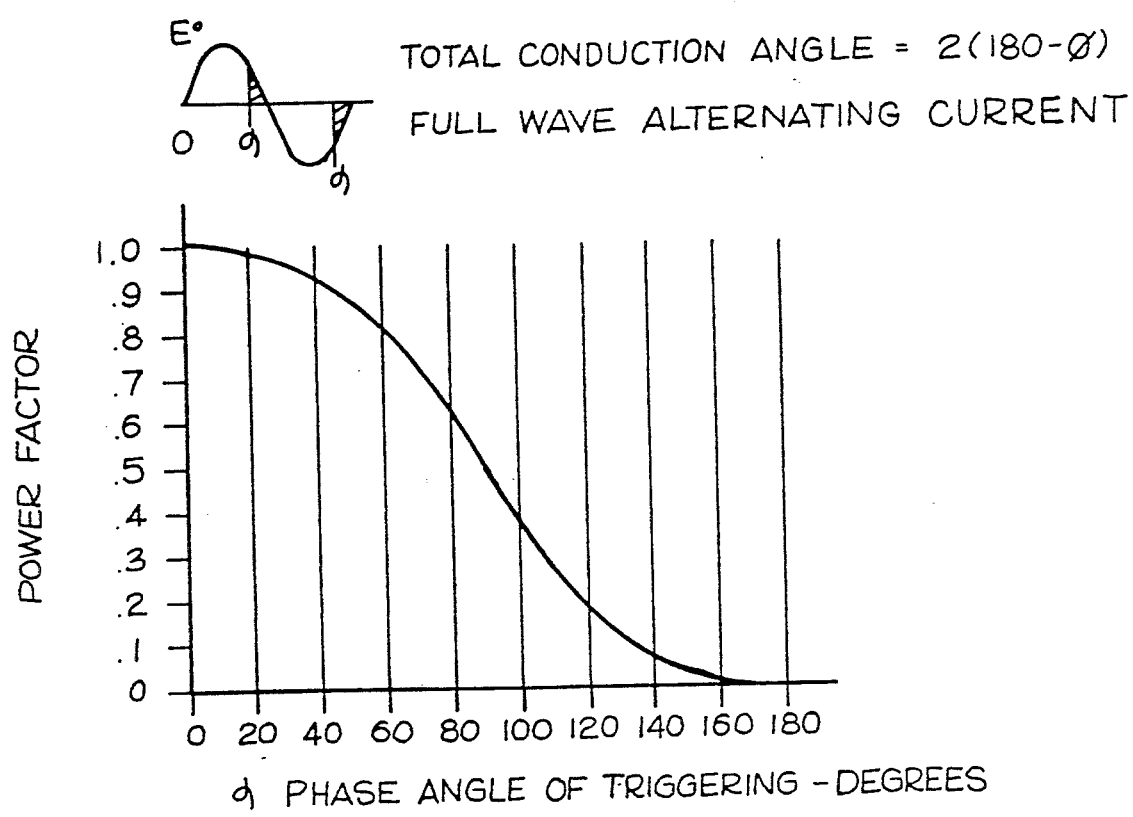
FIG. 3 is a diagram illustrating the effects of AC phase control on power delivered to an incandescent load.

In order to maintain the DC power supply at some desired voltage level, it is necessary to fire the triac a minimum of a 5-30 electrical degrees after the zero crossing (curve B). This ensures that the power supply 2 can absorb enough electrical charge from the potential across terminals 4 and 5 of the triac to provide adequate stored charge to operate the micro-processor control circuit during the remaining electrical cycle that the triac is in a conducting state and thus has little potential developed across terminals 4 and 5. FIG. 3 illustrates the effect of full wave phase control, whereby it can be seen that with a 20 electrical degree triggering phase angle, the power delivered to the load will be about 99% of that delivered by a full electrical waveform. To achieve other desired power intensities delivered to the load, it is simply necessary to delay the firing angle of the triac by an appropriate number of electrical degrees.

Figure 4:
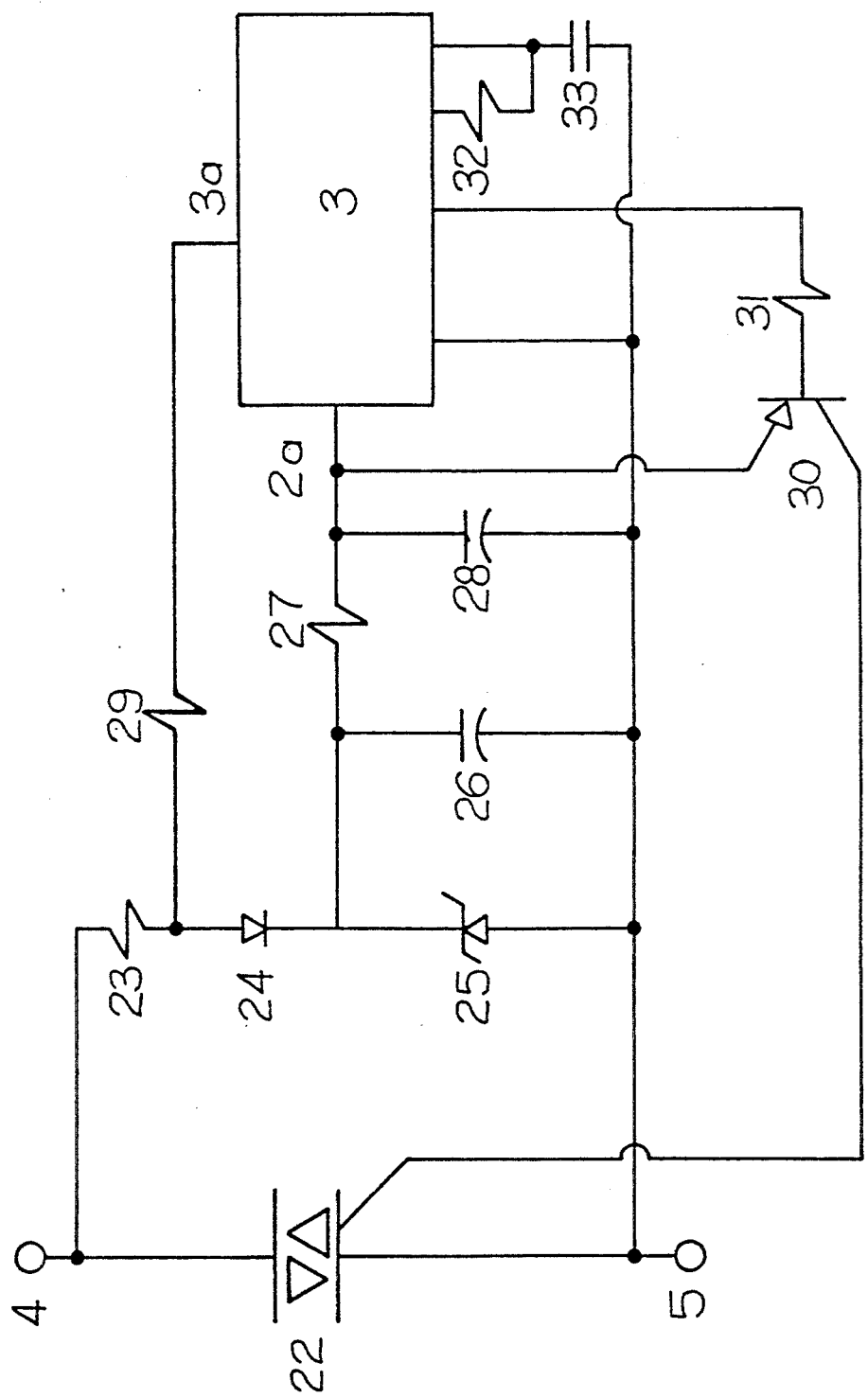
FIG. 4 is a schematic diagram of control circuitry used in the controller of FIG. 1.

FIG. 4 is a detailed schematic of one preferred embodiment of the present invention. Triac 1 is connected between terminals 4 and 5 of the power controller 10, and serves as the high current power control switch. The DC power supply includes resistors 23 and 27, diode 24, zener diode 25, and capacitors 26 and 28. Resistor 23 limits the current delivered to the zener diode 25, and serves as a voltage divider with zener 25. Diode 24 prevents current leakage from the power supply when terminal 4 is negative with respect to terminal 5. During the time diode 24 is conducting current, current will flow into capacitor 26 until the voltage across this capacitor equals the zener breakover voltage of zener diode 25. The zener is necessary to limit the voltage impressed across the capacitor 26 to prevent capacitor failure. At the breakover voltage, the zener then shunts any additional current to ground until the triac either triggers into a low impedance state or the voltage polarity across triac terminals 4 and 5 reverses. It is during these times when there is no charging potential across the triac that capacitor 26 serves as a charge reservoir to capacitor 28 additionally serves as a first order filter to substantially smooth the ripple and create more of a true direct current than what would normally be available if capacitor 26 were solely used to filter the pulsating DC.

Micro-processor control circuit 3 is a very low power CMOS device which has all necessary memory, input/output, and computing functions on a single silicon chip. Resistor/capacitor pair 32, 33 form the RC oscillator timebase for the control circuit 3, and can be a crystal or other form of periodic oscillation device. Resistor 29 limits the current from the voltage divider shunt path across triac terminals 4 and 5 to the lower level logic input 3a of control circuit 3 to sense the moment the AC zero crossing occurs across the triac terminals 4 and 5. PNP transistor 30 and base resistor 31 amplify a 10 micro-second triac trigger pulse from the control circuit and apply the needed gate drive pulse to the triac gate to cause the triac to switch from a high to a low impedance state. The triac then remains on until the triac current crosses zero, at which time the triac commutes to a high impedance state. At the next positive half-cycle the DC power supply circuit is allowed to regain lost charge before the triac is again ready for firing.

Figure 5:
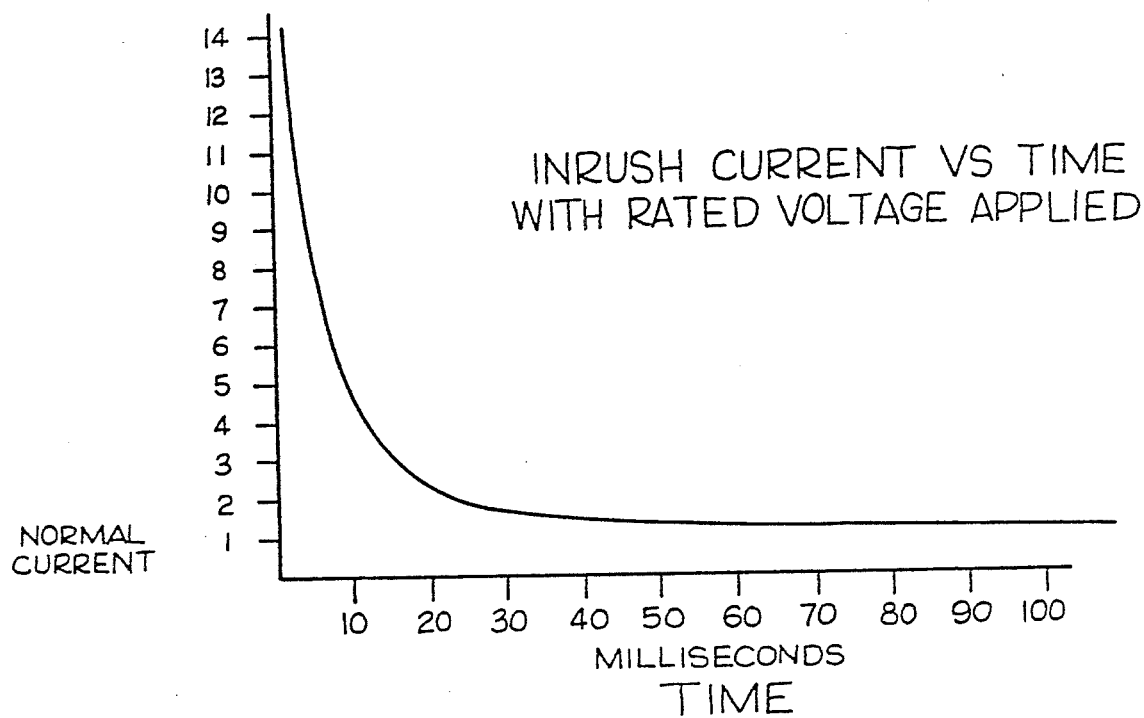

FIG. 5 illustrates the typical initial current surge of a gas filled incandescent lamp which is not provided with the soft-start feature of the present invention. This initial current surge of 16 to 20 times the steady state current is responsible for a majority of the triac failures in existing lighting control devices, and also is the primary reason for lamp filament failure at initial turn-on. The present invention can be programmed so that at initial power turn-on, the power intensity delivered to the load is modulated for an initial very low power level necessary to prewarm the filament, to gradually increasing power over a number of electrical cycles to near 100% of full power if desired. FIG. 2, (curve B) cycles 1-7 illustrate this feature. Using the soft-start power modulation of the present invention, incandescent bulb life has been increased by a factor of five, while average bulb power as maintained at near 100% after initially soft-starting.

Figure 6:
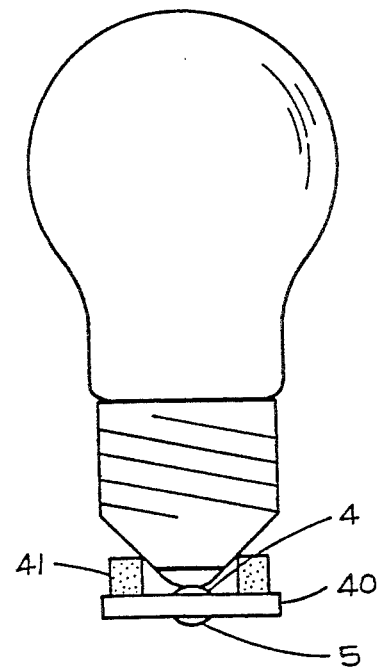
FIG. 6 shows the assembly of the present invention when used with an Edison gas discharge lamp.

FIG. 6 illustrates a preferred packaging arrangement for the two-terminal power controller as described above when used as an individual incandescent light bulb controller for Edison base style lamps. By employing current manufacturing technologies such as surface mounting of components and chip on board die attach techniques, it is possible to package all the components for the inventive power controller into a thin disc less than three millimeters thick and less than 23 millimeters in diameter. Terminals 4 and 5 of the triac power switching device are positioned centrally on the opposing planar faces of a disc 40, this disc being attached by adhesive foamed tape 41 to the base of the lamp screw shell housing 42. Negligible space between the bulb center contact 44 and the fixture center contact 45 of FIG. 6 is consumed. By mounting the present invention as illustrated in FIG. 6, all existing wiring, switches, and fixtures can remain intact, and no modification of the electrical circuit is required by the installer. The invention is susceptible to use in many different and useful lighting control functions, including, but not limited to: soft-starting the filament power for increased bulb life; lamp dimming to predefined or selected intensity levels by the controller responsive to short power interruptions; and allowing predefined or selected time intervals to elapse after initial power application whereby the lighting load is either turned on or off in a singly or multiply occurring sequence at single or repeated intervals of time.

Thus, there has been described a two-terminal power control device which may greatly expand the usefulness of a great variety of alternating current circuits, especially in the area of lighting control, where new useful functions can be added to existing circuits without the need for wiring modifications, with the added benefit of significantly increasing bulb life.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:
1. A two-terminal power control device normally in an off condition until activated by switch means, said device comprising:
   a. input and output terminals adjacent an AC power source and a power load, respectively;
   b. A bi-directional dual silicon controlled rectifier responsive to low voltage current pulses, said rectifier in series with and between the input and output terminals;
   c. micro-processor control circuit means in series with and providing triggering signals to the rectifier, and responsive to momentary power interruptions in the form of operator-controlled activation of the switch means;

d. DC power supply means connected across the rectifier to provide power to the control circuit means when the rectifier is in a state of high or low impedance and in absence of AC potential across the rectifier;

e. memory data retention means coupled to control circuit means to retain recently stored data during periods of power removal from said AC power source, f. input and output terminals on opposed upper and lower surfaces of a package, said package having dimensions such that it is retained between an Edison-style lamp screw shell housing and an incandescent bulb inserted therein, and g. said power control device being provided with a timer responsive to momentary power interruptions.

2. The device as recited in claim 1, wherein the load comprises an incandescent bulb activated by the switch means.

3. The device as recited in claim 1, wherein the micro-processor control circuit means delays the activation of the rectifier until after a zero crossing of an AC waveform impressed across the input and output terminals.

4. The device as recited in claim 1, wherein the micro-processor is programmed to provide a predetermined level of power to the load depending upon the number of on-off cycles of the switch means.

5. A method of providing an electrical load responsive to momentary power interruptions, comprising the steps of:

a. programming a micro-processor controlled circuit means to be responsive to momentary power interruptions initiated by an operator;

b. connecting a bi-directional dual silicon controlled rectifier in series with and between a pair of input and output terminals and interconnecting the input and output terminals in series with an AC power source and the electrical load;

c. interrupting the AC power supply to the microprocessor such that responsive thereto the microprocessor provides power to a load in a predetermined manner, d. packaging said micro-processor control circuit means, said rectifier and said input and output terminals in a package and inserting said package between an Edison-style lamp screw shell housing and an incandescent bulb inserted therein, and e. providing a timer in said package responsive to momentary power interruptions.

6. The method as recited in claim 5, further comprising interrupting the AC power supply in order to provide a predetermined level of power to the load depending upon the number of on-off cycles of the switch means.

7. The method as recited in claim 5, further comprising interrupting the AC power supply in order to provide power to the load a predetermined period of time after said interruption.

8. A method for controlling either the conduction time, duty cycle of illumination intensity of a lamp which comprises the steps of:

a. providing in memory certain data values corresponding to the timing or sequence at which power interruptions to said memory may occur, b. creating timed or sequenced power interruptions to said memory and thereby c. selecting a particular data value for storage in said memory which is operable to control either said conduction time, said duty cycle or said illumination intensity of said lamp, and d. controlling said conduction time, duty cycle, or illumination intensity of said lamp by connecting an AC triggerable switch to said lamp and controlling its conductive state by the application thereto of said particular data value selected for storage in said memory.

9. Circuitry for controlling the current level, duty cycle and conduction time for current supplied to a selected load including, in combination:

a. an AC controlled switch connected to a load, b. data storage and conversion means connected to a gate or control electrode of said AC controlled switch and responsive to manually controlled power interruptions which are made at a predetermined time and sequence with respect to the present current level, duty cycle or current conduction time at said load for in turn changing said current level, duty cycle or conduction time to another and different current level, duty cycle or conduction time, and c. said AC controlled switch is a Triac which is connectable between one side of said load and one side of an AC supply voltage, said AC supply voltage being further connected through a manually operated and controlled switch to another side of said load, and said data storage and conversion means including a micro-processor connected to a DC voltage supply and further connected across input and output terminals of said Triac and to a gate or control electrode thereof, said micro-processor being operative to store new data values therein in response to the manual switching action of said manually operated switch in a controlled sequence to thereby change the phase angle and conduction time of said semiconductor Triac and thereby in turn control and change the level of current, the duty cycle, or the conduction time of current conducted through said load.

* * * * *